United States Patent
Ogawa et al.

(10) Patent No.: US 11,221,042 B2
(45) Date of Patent: Jan. 11, 2022

(54) HALF THRUST BEARING, THRUST BEARING, BEARING DEVICE, AND INTERNAL COMBUSTION ENGINE

(71) Applicant: DAIDO METAL COMPANY LTD., Nagoya (JP)

(72) Inventors: Tetsuya Ogawa, Inuyama (JP); Kazuki Sakai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/762,633

(22) PCT Filed: Nov. 8, 2018

(86) PCT No.: PCT/JP2018/041549
§ 371 (c)(1),
(2) Date: May 8, 2020

(87) PCT Pub. No.: WO2019/093438
PCT Pub. Date: May 16, 2019

(65) Prior Publication Data
US 2020/0277988 A1    Sep. 3, 2020

(30) Foreign Application Priority Data

Nov. 10, 2017  (JP) .............................. JP2017-217483

(51) Int. Cl.
*F16C 17/04*  (2006.01)
*F16C 33/04*  (2006.01)
(Continued)

(52) U.S. Cl.
CPC ............ *F16C 33/1095* (2013.01); *F16C 9/02* (2013.01); *F16C 17/04* (2013.01); *F16C 33/046* (2013.01); *F16C 33/20* (2013.01); *F16C 2240/60* (2013.01)

(58) Field of Classification Search
CPC .... F16C 9/02; F16C 9/04; F16C 17/04; F16C 17/10; F16C 17/107; F16C 33/046;
(Continued)

(56) References Cited

U.S. PATENT DOCUMENTS

| | | | |
|---|---|---|---|
| 10,233,967 B2 * | 3/2019 | Sakurai | ................ F02F 7/0053 |
| 2002/0094143 A1 * | 7/2002 | Yang | ........................ F16C 9/02 |
| | | | 384/294 |

(Continued)

FOREIGN PATENT DOCUMENTS

| CN | 104937290 A | 9/2015 |
|---|---|---|
| GB | 2542497 A | 3/2017 |

(Continued)

OTHER PUBLICATIONS

Machine Translation of JP 2014-070662 (Year: 2014).*

(Continued)

*Primary Examiner* — Alan B Waits
(74) *Attorney, Agent, or Firm* — Snyder, Clark, Lesch & Chung, LLP

(57) ABSTRACT

This half thrust bearing having a half-ring shape has: a sliding surface for receiving force in the axial direction; a back surface opposed to the sliding surface; and a resin covering layer on the sliding surface. The half thrust bearing is characterized in that the thickness of the resin covering layer is greatest at the circumferential central part of the half thrust bearing, and becomes lesser toward both circumferential ends of the half thrust bearing. The present invention also pertains to a thrust bearing, a bearing device, and an internal combustion engine.

15 Claims, 4 Drawing Sheets

(51) Int. Cl.
*F16C 33/20* (2006.01)
*F16C 9/02* (2006.01)
*F16C 33/10* (2006.01)

(58) Field of Classification Search
CPC .......... F16C 33/1095; F16C 33/20–206; F16C 2360/22; F16C 33/208; F16C 2240/60
See application file for complete search history.

(56) References Cited

U.S. PATENT DOCUMENTS

| | | | | |
|---|---|---|---|---|
| 2015/0323006 | A1* | 11/2015 | George | F16C 33/208 |
| | | | | 384/291 |
| 2017/0167530 | A1 | 6/2017 | Tanaka et al. | |
| 2017/0307005 | A1* | 10/2017 | Ejakov | F16C 9/04 |
| 2018/0355910 | A1* | 12/2018 | Sakurai | F16C 33/046 |
| 2019/0101157 | A1* | 4/2019 | Shortridge, Sr. | F16C 43/02 |

FOREIGN PATENT DOCUMENTS

| | | |
|---|---|---|
| JP | S63141321 U | 9/1988 |
| JP | H11-201145 A | 7/1999 |
| JP | 2008-510107 A | 4/2008 |
| JP | 2013-130273 A | 7/2013 |
| JP | 2014-70662 A | 4/2014 |
| JP | 6153587 B2 | 6/2017 |
| WO | 2009140745 A1 | 11/2009 |
| WO | 2017170544 A1 | 10/2017 |

OTHER PUBLICATIONS

International Search Report issued in corresponding International Application No. PCT/JP2018/041549 dated Feb. 5, 2019, 2 pages.
Office Action issued in corresponding Chinese Application No. 201880072478.1 dated Feb. 2, 2021, 8 pages.
Office Action issued in corresponding Korean Application No. 10-2020-7013175 dated Jun. 3, 2021, 6 pages.
Extended European Search Report issued in corresponding European Application No. 18876038.3 dated Jul. 13, 2021, 7 pages.
Office Action issued in corresponding Chinese Application No. 2010880072478.1, dated Aug. 23, 2021, 7 pages.

* cited by examiner

HALF THRUST BEARING, THRUST BEARING, BEARING DEVICE, AND INTERNAL COMBUSTION ENGINE

TECHNICAL FIELD

The present invention relates to a semi-annular shaped half thrust bearing particularly for receiving an axial force of a crankshaft of an internal combustion engine of automobiles, ships, general industrial machines, and the like. In particular, the present invention relates to a half thrust bearing having a sliding surface for receiving the axial force and a back surface opposite to the sliding surface, the half thrust bearing including a substrate and a resin coating layer coated on the substrate, the surface of the resin coating layer being the sliding surface. Furthermore, the present invention also relates to a thrust bearing including the half thrust bearing, a bearing device including the thrust bearing, and an internal combustion engine including the bearing device.

BACKGROUND ART

A crankshaft of an internal combustion engine is rotatably supported in its journal part by a lower portion of a cylinder block of the engine via a main bearing including a pair of half bearings combined into a cylindrical shape. One or both of the pair of half bearings are combined with a half thrust bearing for receiving an axial force of the crankshaft. The half thrust bearing is placed on one or both axial end faces of the half bearing. The half thrust bearing receives an axial force generated in the crankshaft. That is, the half thrust bearing is provided for the purpose of bearing an axial force applied to the crankshaft, for example, when the crankshaft is connected to a transmission by a clutch.

For the half thrust bearing, used is a bimetal produced by bonding a thin bearing alloy layer to a back-metal layer made of steel or the like. A half thrust bearing including a resin layer further coated on the bimetal has been also well known (JP2013-130273A and the like). The coating with the soft and elastic resin layer having low friction improves lubricating properties, thereby preventing seizure or wear of the bearing.

SUMMARY OF INVENTION

In recent years, engines have higher performance and functionality. Due to the improvement of the engines, a counter member such as a shaft has lower rigidity, and a bearing is required to receive a higher surface pressure. Such conditions cause the bearing to be used in severe environment. In particular, due to application of idle stop operation and hybrid vehicles, the bearing is desired to have excellent seizure resistance.

In such a bearing, during operation, a fluid lubrication film of lubrication oil or the like is formed between a surface of a counter member (e.g., shaft member) and a sliding surface of a sliding member, thereby preventing direct contact between the surface of the counter member and the sliding surface of the sliding member. In a thrust bearing according to a conventional technique, a resin coating layer has a uniform layer thickness. However, an insufficient oil film pressure may lead to insufficient support capability, and this may cause seizure in the above environment where the bearing is used. In order to prevent the seizure, an oil film needs to be formed on the entire sliding surface, but the conventional technique is insufficient to provide excellent seizure resistance in severe engine environment.

An object of the present invention is to provide a half thrust bearing and a thrust bearing having excellent seizure resistance by prompting excellent formation of an oil film.

According to an aspect of the present invention, provided is a half thrust bearing that has a semi-annular shape and has a sliding surface for receiving an axial force and a back surface opposite to the sliding surface and in which the sliding surface includes a resin coating layer coated on a substrate. In the half thrust bearing, the resin coating layer has a thickness that is maximum at a circumferential center portion of the half thrust bearing and is reduced toward circumferential ends of the half thrust bearing.

The "semi-annular shape" is defined by having an inner periphery and an outer periphery defined by two semicircles, while the two semicircles do not need to be geometrically precise semicircles. For example, a part of an outer surface or an inner surface of the semi-annular shape may protrude in a radial direction (e.g., at a circumferential end face), and an extension portion may extend from the circumferential end face (e.g., in a direction perpendicular to the circumferential end face).

According to an embodiment of the present invention, the circumferential center portion is preferably located at a circumferential angle of 75° to 105°.

According to an embodiment of the present invention, when the half thrust bearing is viewed along a circumferential end face of the half thrust bearing, the sliding surface of the half thrust bearing preferably has a convex contour protruding at the circumferential center portion.

According to an embodiment of the present invention, the contour of the sliding surface is preferably curved.

According to an embodiment of the present invention, the contour of the sliding surface is preferably made of straight lines.

According to an embodiment of the present invention, the contour of the sliding surface may be made of a curve and a straight line.

According to an embodiment of the present invention, the thickness of the resin coating layer depends on a circumferential angle and is preferably defined by the following equation:

$$t(\theta)/t_{max} \times 100 = A \times \exp[-\{(\theta-B)/C\}^2] + D \qquad (1),$$

where $t(\theta)$ represents a value of the thickness of the resin coating layer at a circumferential angle $\theta$; $t_{max}$ represents a maximum value of the thickness of the resin coating layer; B represents a value of a circumferential angle (°) at which the thickness of the resin coating layer is maximum; and A, C, and D are constants that satisfy $10 \leq C \leq 100$, $30 \leq D \leq 95$, and $A = 100 - D$.

According to an embodiment of the present invention, a position at which an inclination of a tangent line to a curve of the thickness of the resin coating layer at the circumferential angle defined by the equation (1) is maximum is preferably located at a position apart from a B position by 15° to 65°, and more preferably located at a position apart from the B position by 20° to 60°.

According to an embodiment of the present invention, a maximum inclination of a tangent line to a curve of $t(\theta)/t_{max} \times 100$ at the circumferential angle defined by the equation (1) is preferably 0.10 to 1.20, and more preferably 0.15 to 0.90.

According to another aspect of the present invention, the present invention provides a thrust bearing including two half thrust bearings, wherein at least one of the two half thrust bearings is the half thrust bearing of the present invention.

According to an embodiment of the present invention, the half thrust bearing is preferably for receiving an axial force of a crankshaft of an internal combustion engine.

According to still another aspect of the present invention, the present invention also provides a bearing device including the half thrust bearing of the present invention.

According to still another aspect of the present invention, the present invention also provides an internal combustion engine including the bearing device of the present invention.

In the half thrust bearing coated with resin of the present invention, by controlling thickness distribution in a circumferential direction of the resin coating layer, formation of an oil film is prompted, and seizure resistance is improved without deteriorating low friction properties.

A configuration of the present invention and its many advantages will be described in more detail below with reference to the accompanying drawings. The drawings show non-limiting embodiments merely for illustration purpose.

DESCRIPTION OF EMBODIMENTS

Figure 1:
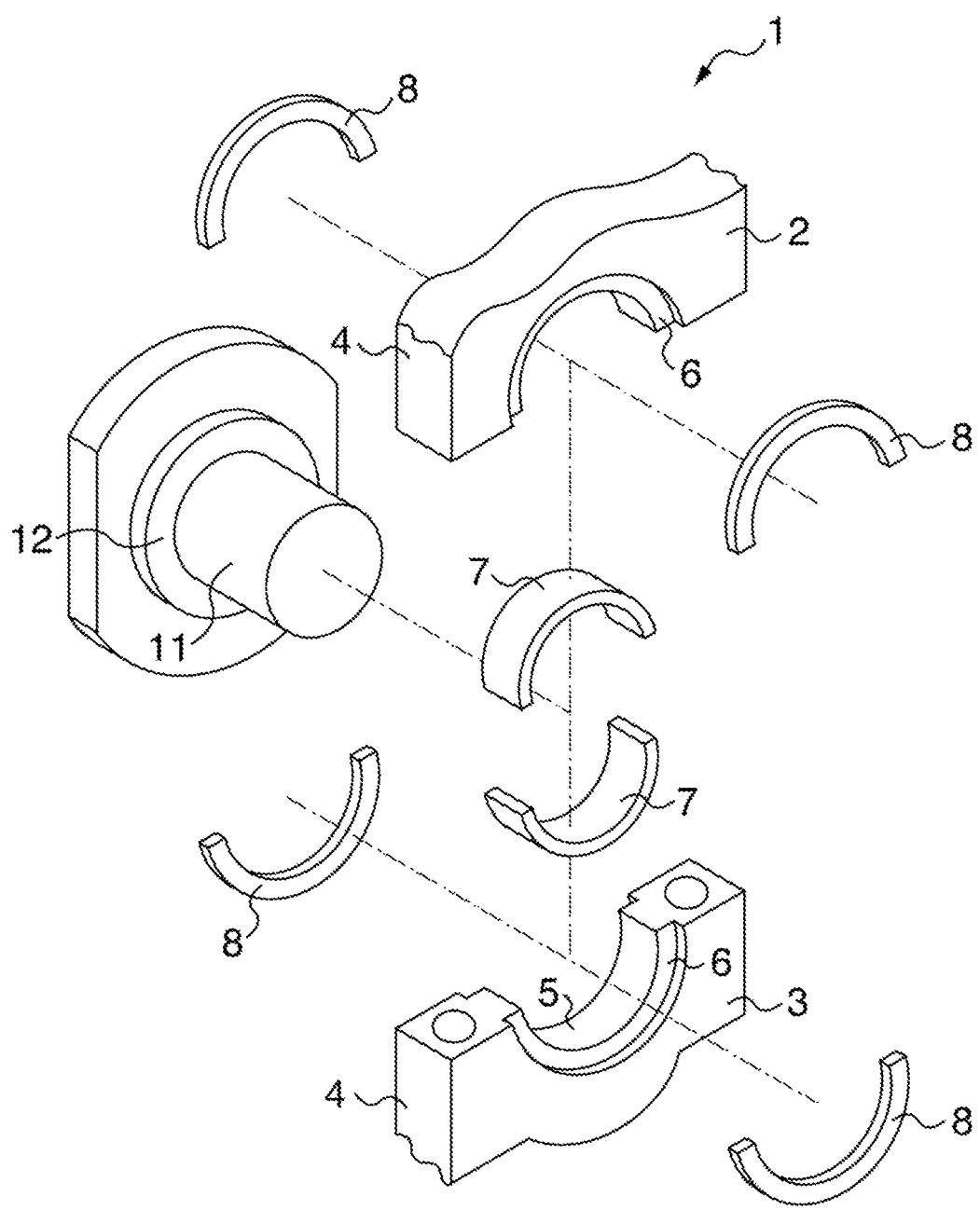
FIG. 1 is an exploded perspective view of a bearing device.
Figure 2:
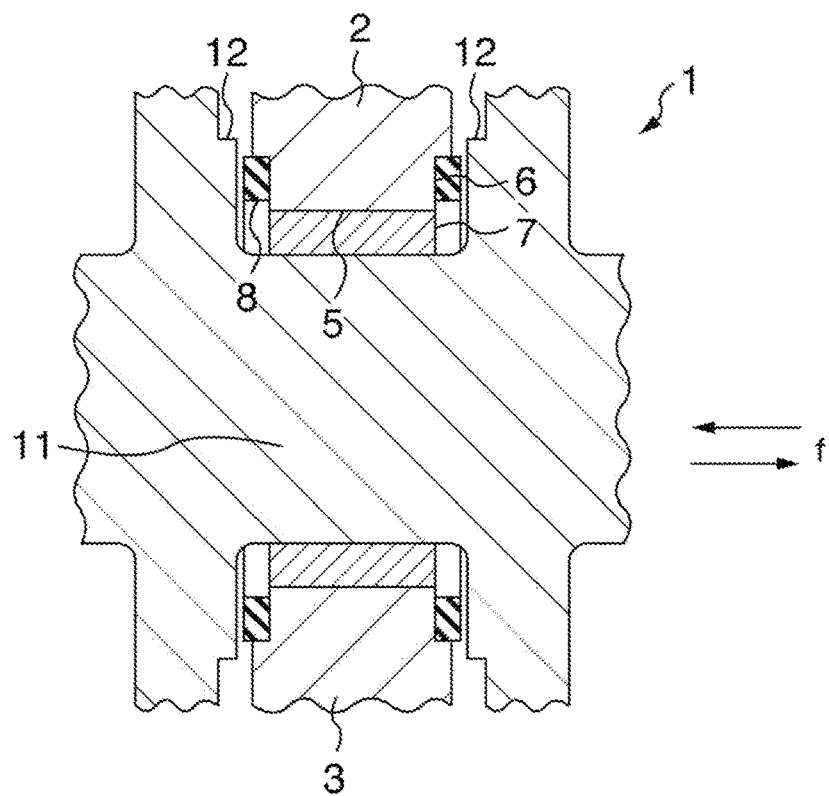
FIG. 2 is a cross-sectional view of the bearing device.

First, with reference to FIGS. 1 and 2, a description will be given of a general configuration of an embodiment of a bearing device 1 including a half thrust bearing 8 of the present invention. As shown in FIGS. 1 and 2, a bearing housing 4 includes a cylinder block 2 and a bearing cap 3 attached to a lower portion of the cylinder block 2. The bearing housing 4 has a bearing hole (holding hole) 5 and seats 6. The bearing hole 5 is circular and passes through side surfaces of the bearing housing 4. The seats 6 are each configured as an annular recess at a peripheral edge of the bearing hole 5 on the side surface. In the bearing hole 5, half bearings 7 combined into a cylindrical shape are fitted. The half bearings 7 rotatably support a journal part 11 of a crankshaft. In the seats 6, the half thrust bearings 8 combined into an annular shape are fitted. The half thrust bearings 8 receive an axial force f (see FIG. 2) via a thrust collar surface 12 of the crankshaft. Instead of being combined into the annular shape, the half thrust bearing 8 may be fitted, for example, only on the cylinder block 2 side.

Figure 3:
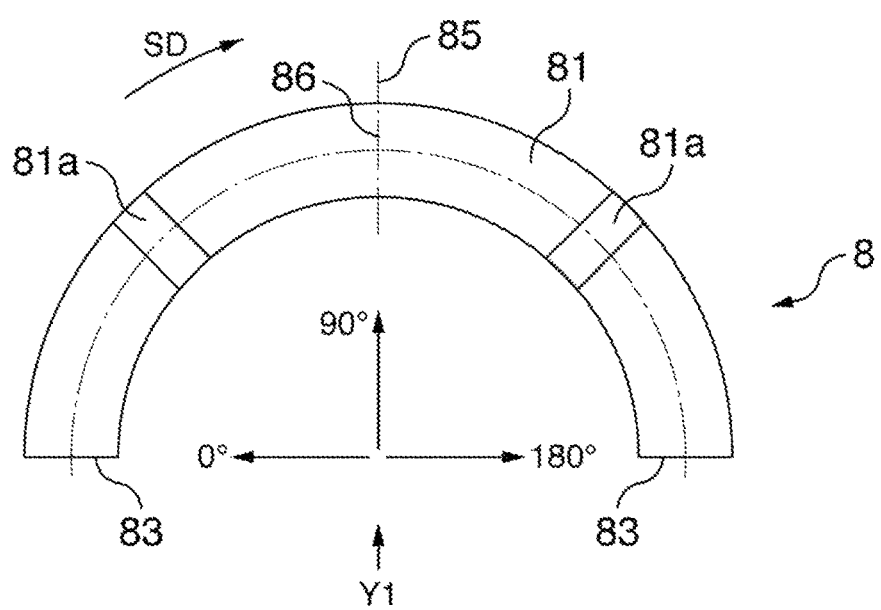
FIG. 3 is a front view of an embodiment of a half thrust bearing according to the present invention.
Figure 4:
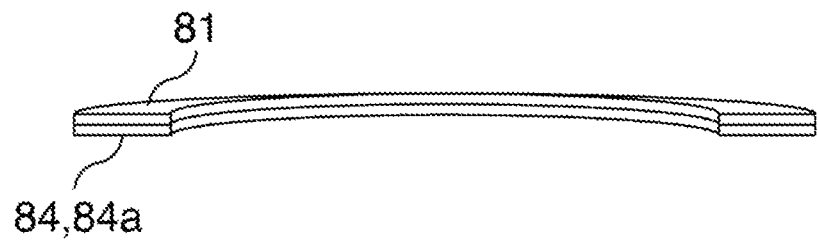
FIG. 4 is a side view of the half thrust bearing viewed from a direction indicated by arrow Y1 in FIG. 3.

Next, FIGS. 3 and 4 respectively show a front view and a perspective view of an embodiment of the half thrust bearing 8 of the present invention. The half thrust bearing 8 has a resin coating layer 88 on a substrate 89 having a flat semi-annular shape. In general, the substrate 89 is preferably made of bimetal produced by bonding a thin bearing alloy layer to a back-metal layer made of steel. However, the substrate 89 may have a configuration including only a back-metal, or may have another configuration. The half thrust bearing 8 has a sliding surface 81 (bearing surface) facing an axial direction, and the sliding surface 81 is composed of the resin coating layer. In order to enhance lubrication oil retainability, the sliding surface 81 may have at least one oil groove 81a (two oil grooves are shown in FIG. 3) between circumferential end faces 83.

The half thrust bearing 8 defines a reference surface 84 perpendicular to the axial direction. The reference surface 84 includes a back surface 84a that is substantially flat and has been adapted to be arranged in the seat 6 of the cylinder block 2 (see FIG. 4). The back surface 84a is also a bottom surface of the substrate 89. The substrate 89 has an upper surface 82 opposite to the reference surface 84 (back surface 84a) in the axial direction. The upper surface of the substrate is coated with the resin coating layer 88. A surface of the resin coating layer 88 forms the sliding surface 81 apart from the reference surface 84 (back surface 84a) in the axial direction. The sliding surface 81 receives an axial force f (see FIG. 2) via the thrust collar surface 12 of the crankshaft.

Figure 5:
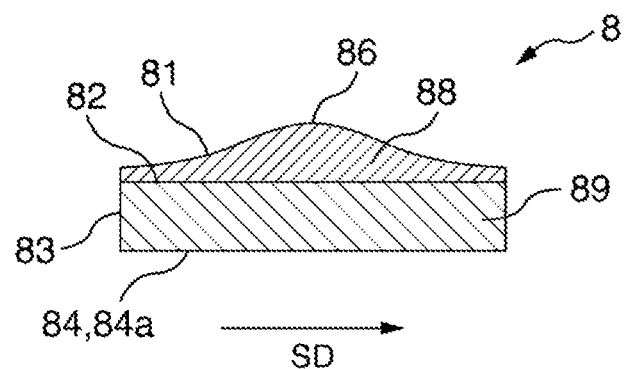
FIG. 5 is a developed view of a cross section cut in a circumferential direction at a radial center portion of an embodiment of the half thrust bearing according to the present invention.

FIG. 5 is a developed view of a cross section cut along a predetermined radius of the half thrust bearing 8. Lateral ends of the half thrust bearing 8 shown in FIG. 5 indicate the circumferential end faces 83 (circumferential angle: 0°, 180°) of the half thrust bearing 8, and a lateral center of the half thrust bearing 8 shown in FIG. 5 indicates a circumferential center 85 (circumferential angle: 90°) of the half thrust bearing 8. The circumferential angle refers to an angle from the circumferential end faces 83 around a center of the annular shape of the half thrust bearings 8. In the present specification, a rear end face of the half thrust bearing 8 in a sliding direction in which the crankshaft slides (indicated by arrow SD in FIG. 3) is located at 0°, and a front end face of the half thrust bearing 8 in the sliding direction is located at 180° (see FIG. 3). (However, the front end face of the half thrust bearing 8 in the sliding direction may be located at 0° without affecting the scope of the present invention.)

FIG. 5 shows the resin coating layer 88 on the substrate 89. The resin coating layer 88 has a thickness that is maximum at a circumferential center portion 86 of the half thrust bearing and is reduced toward the circumferential ends 83 of the half thrust bearing. The circumferential center portion 86 does not need to be precisely located at the circumferential center 85 (circumferential angle: 90°). The overall thickness distribution of the resin coating layer 88 only needs to have a convex shape when viewed in the sliding direction. The circumferential center portion 86 is preferably located at a circumferential angle of 75° to 105°.

The thickness of the resin coating layer preferably has a maximum value of approximately 2 to 30 μm and a minimum value of approximately 1 to 28 μm. When the thickness of the resin coating layer has a maximum value and a minimum value in this range, it is possible to prevent wear of the resin coating layer from causing early exposure of the substrate and deterioration of thermal conductivity, thereby improving seizure resistance.

By controlling the thickness distribution of the resin coating layer to have the above shape, formation of an oil film of lubrication oil is facilitated, and seizure resistance is improved without deteriorating low friction properties. The mechanism works in the following manner.

Resin is an elastic material and thus has a stretching (expansion and contraction) effect. Accordingly, the resin coating layer achieves a stretching effect mainly at the circumferential center portion having a large thickness, and an oil film pressure is generated due to flow distribution of the lubrication oil. Thus, excellent formation of an oil film can be prompted on the entire thrust bearing surface, thereby improving seizure resistance.

Furthermore, the thickness distribution in the circumferential direction of the resin coating layer 88 at a circumferential angle is preferably distribution defined by the following equation:

$$t(\theta)/t_{max} \times 100 = A \times \exp[-\{(\theta-B)/C\}^2] + D \quad (1),$$

where $t(\theta)$ represents a value of the thickness of the resin coating layer 88 at a circumferential angle $\theta$, $t_{max}$ represents a maximum value of the thickness of the resin coating layer, B represents a value of a circumferential angle (°) at which the thickness of the resin coating layer is maximum, and A, C, and D are constants that satisfy $10 \leq C \leq 100$, $30 \leq D \leq 95$, and $A = 100 - D$.

A position at which an inclination of a tangent line to a curve of the thickness of the resin coating layer 88 at the circumferential angle defined by the equation (1) is maximum is preferably located at a position apart from a B position (circumferential center portion 86) by 15° to 65°, and more preferably located at a position apart from the B position by 20° to 60°. Furthermore, a maximum inclination of the tangent line to the curve of $t(\theta)/t_{max} \times 100$ at the circumferential angle defined by the equation (1) is preferably 0.10 to 1.20, and more preferably 0.15 to 0.90. When these conditions are satisfied, the formation of an oil film is further facilitated, and the seizure resistance is further improved.

The thickness distribution in the circumferential direction of the resin coating layer 88 is preferably satisfied at any radial position. However, the thickness distribution only needs to be satisfied at least at a radial position in a radial center. Also in this case, the formation of an oil film is facilitated. Even in a case where the thickness distribution in the circumferential direction of the resin coating layer 88 is satisfied at any radial position, the circumferential angle of the circumferential center portion 86 does not need to be the same. However, at any radial position, the circumferential angle of the circumferential center portion 86 is preferably 75° to 105°.

The above thickness distribution in the circumferential direction of the resin coating layer 88 is overall distribution and has small local unevenness, but such local unevenness is acceptable.

As shown in FIG. 5, the upper surface 82 of the substrate 89 of the half thrust bearing 8 is preferably a flat surface. In this case, the thickness distribution of the resin coating layer 88 determines a contour shape of the sliding surface 81. At this time, a height difference between a circumferential center portion and a circumferential end of the contour shape of the sliding surface 81 is preferably approximately 1 to 17 μm.

Figure 6:
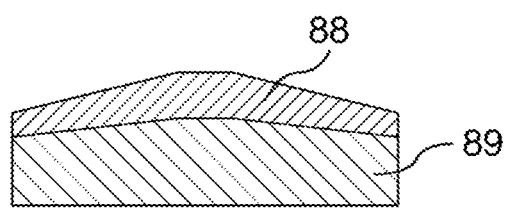
FIG. 6 is a developed view of a cross section cut in a circumferential direction at a radial center portion of another embodiment of the half thrust bearing according to the present invention.
Figure 8:
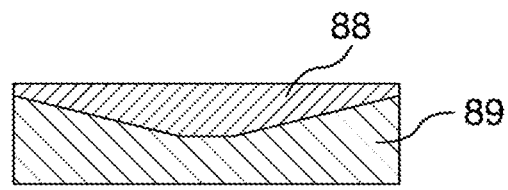
FIG. 8 is a developed view of a cross section cut in a circumferential direction at a radial center portion of still another embodiment of the half thrust bearing according to the present invention.
Figure 9:
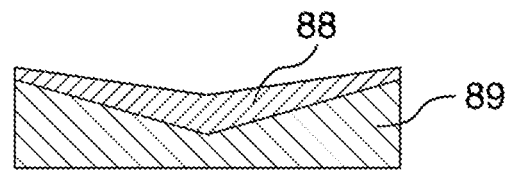
FIG. 9 is a developed view of a cross section cut in a circumferential direction at a radial center portion of still another embodiment of the half thrust bearing according to the present invention.

However, the upper surface 82 of the substrate 89 does not need to be a flat surface. For example, as shown in FIG. 6, the upper surface 82 of the substrate 89 may be a surface raised at a circumferential center portion. Alternatively, as shown in FIGS. 8 and 9, the upper surface 82 of the substrate 89 may be a surface recessed toward a circumferential center. Alternatively, the upper surface 82 of the substrate 89 may have another shape. In this case, the contour shape of the sliding surface 81 may have a raised center (FIG. 6), a flat center (FIG. 8), or a recessed center (FIG. 9), or may be another shape.

Figure 7:
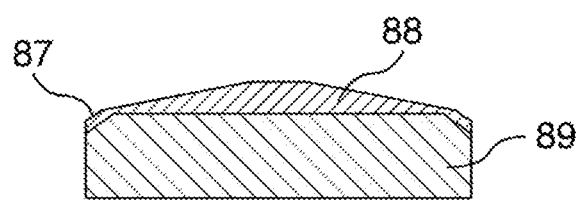
FIG. 7 is a developed view of a cross section cut in a circumferential direction at a radial center portion of still another embodiment of the half thrust bearing according to the present invention.

Regardless of the shape of the upper surface 82 of the substrate 89, thrust reliefs 87 may be formed (FIG. 7). The thrust reliefs 87 are provided in regions adjacent to the circumferential end faces on the sliding surface 81 side, and have a thickness gradually reduced toward the end faces. The thrust reliefs 87 each extend along an entire radial length of the circumferential end face of the half thrust bearing 8. The thrust reliefs 87 are provided in order to reduce positional deviation between the circumferential end faces 83 of the pair of half thrust bearings 8 caused by, for example, positional deviation that occurs when the half thrust bearings 8 are assembled in the split-type bearing housing 4.

Furthermore, the half thrust bearing 8 of the present invention is preferably formed so that at any radial position of the half thrust bearing 8, an axial distance from the reference surface 84 to the sliding surface 81 is maximum at the circumferential center portion 86 of the half thrust bearing 8 and is reduced toward the circumferential ends 83 of the half thrust bearing. That is, when the half thrust bearing 8 is viewed along the circumferential direction of the half thrust bearing 8, the sliding surface 81 of the half thrust bearing 8 preferably has a convex contour protruding at the circumferential center portion. The contour of the sliding surface 81 may be composed of a curve or a straight line.

In a case where the upper surface 82 of the substrate 89 of the half thrust bearing 8 is a flat surface, the contour of the sliding surface 81 is determined by the thickness distribution of the resin coating layer 88, and the sliding surface 81 protrudes at a portion of the resin coating layer 88 having the maximum thickness. During operation of an internal combustion engine, due to a rotational motion of a counter shaft, the protruding contour of the sliding surface 81 at the circumferential center portion causes an oil film pressure to be generated by a wedge film effect around the circumferential center portion. Furthermore, combined with the generation of an oil film pressure due to the stretching effect of the resin coating layer described above, excellent formation of an oil film can be prompted on the entire thrust bearing surface, thereby improving seizure resistance and preventing wear. Even when the half thrust bearing 8 comes into contact with the counter shaft, since the half thrust bearing 8 is coated with the resin coating layer, the low friction properties are not deteriorated.

Even in a case where the upper surface 82 of the substrate 89 of the half thrust bearing 8 is not a flat surface and a position of the most protruding portion of the contour of the sliding surface 81 does not correspond to a position at which the thickness of the resin coating layer 88 is maximum, the most protruding portion of the contour of the sliding surface 81 and the portion of the resin coating layer 88 having the maximum thickness are located close to each other in the vicinity of the circumferential center 85. Therefore, an effect similar to the above effect can be obtained.

The resin that forms the resin coating layer 88 preferably includes, for example, a synthetic resin composed of one or more selected from PAI (polyamidimide), PI (polyimide), PBI (polybenzimidazole), PA (polyamide), phenol, epoxy, POM (polyacetal), PEEK (polyether ether ketone), PE (polyethylene), PPS (polyphenylene sulfide), PEI (polyetherimide), a fluororesin, and an elastomer.

In addition to the resin, the resin coating layer may include both or one of a solid lubricant and a filler. The solid lubricant is, for example, one or more selected from graphite, $MoS_2$, $WS_2$, h-BN, PTFE, melamine cyanurate, graphite fluoride, phthalocyanine, graphene nanoplatelet, fullerene, ultrahigh molecular weight polyethylene, and Nε-lauroyl-L-lysine. The resin coating layer including the solid lubricant achieves higher sliding properties of a sliding layer. The resin coating layer preferably includes 10 to 70 volume % of solid lubricant. The filler is, for example, one or more selected from oxides such as $CaF_2$, $CaCO_3$, talc, mica, mullite, calcium phosphate, iron oxide, aluminum oxide, chromium oxide, cerium oxide, zirconium oxide, titanium oxide, silicon oxide, and magnesium oxide, carbides such as $Mo_2C$ (molybdenum carbide) and SiC, nitrides such as aluminum nitride, silicon nitride, and c-BN, and diamond. The resin coating layer including the filler achieves higher wear resistance of the sliding layer. The resin coating layer preferably includes 1 to 25 volume % of filler.

As described above, the substrate 89 of the half thrust bearing 8 preferably includes a back-metal layer and a bearing alloy layer provided on the back-metal layer. The back-metal layer may include a metal plate made of an Fe alloy, Cu, a Cu alloy, or the like. The bearing alloy layer may include an alloy such as a copper alloy, an aluminum alloy, a tin alloy, or the like. The substrate 89 of the half thrust bearing 8 may include, on the bearing alloy layer, a plating layer made of a tin alloy, a bismuth alloy, a lead alloy, or the like, and a metal overlay layer deposited by a PVD method. The substrate 89 of the half thrust bearing 8 may include no back-metal layer and include only a bearing alloy layer made of an aluminum alloy or a copper alloy having high strength, or the like. The substrate 89 of the half thrust bearing 8 may include a porous metal layer on a surface of the back-metal layer, i.e., an interface between the back-metal layer and the bearing alloy layer. The porous metal layer may have the same composition as the back-metal layer, or may have a different composition from the back-metal layer or may include a different material from the back-metal layer. The porous metal layer provided on the surface of the back-metal layer improves bonding strength between the sliding layer and the back-metal layer. The porous metal layer may be formed by sintering metal powder made of Cu, a Cu alloy, Fe, an Fe alloy, or the like on a surface of a metal plate or strip, or the like. The porous metal layer may have a porosity of approximately 20 to 60%. The porous metal layer may have a thickness of approximately 0.05 to 0.50 mm. In this case, the sliding layer coated on a surface of the porous metal layer may have a thickness of approximately 0.05 to 0.40 mm. However, the sizes described above are embodiments, and the present invention is not limited to the above values, and the sizes may be changed to different sizes.

Next, a method of coating the resin coating layer 88 on the substrate 89 will be described. The resin coating layer 88 is preferably coated on the substrate 89, for example, by a coating method such as spray coating, roll coating, pad coating, or screen coating. In order to control the thickness of the resin coating layer 88, in such a coating method, an amount of discharge, an amount of adhesion, and an amount of transfer of resin are partially adjusted to control the layer thickness distribution shape on the entire sliding surface. As an embodiment of the adjustment of the amount of discharge of resin, for example, a large number of discharge nozzles are arranged in a row in a direction perpendicular to a line, and the discharge nozzles are adjusted so that a discharge nozzle located closer to a center discharges a larger amount of resin. When the half thrust bearing 8 is conveyed in the line while the circumferential ends of the half thrust bearing 8 are arranged to face a flow direction of the line, at the circumferential center portion of the half thrust bearing 8, the amount of adhesion of resin is maximum and the coating can be controlled to have a maximum thickness. The adjustment of the amount of discharge of resin from the discharge nozzles allows control of the thickness distribution of the resin coating layer so that the resin coating layer has desired thickness distribution.

EXAMPLES

A flat semi-annular shaped substrate (with outer diameter: 80 mm, inner diameter: 60 mm, thickness: 1.5 mm) was prepared in which a bearing alloy layer made of an aluminum alloy (Al—Sn—Si) was bonded to a steel back-metal. As a resin, PAI was used. A large number of coating material discharge nozzles were arranged in a row in a direction perpendicular to a line, and the substrate was conveyed in the line so that the resin was applied to a surface of the bearing alloy layer by a spray coating method to form a resin coating layer. In this manner, sample A and sample B of a half thrust bearing were produced. In sample A, the resin coating layer had a thickness that was maximum at a circumferential center portion and was reduced toward circumferential ends (a portion having this shape is hereinafter referred to as convex portion). In sample B, the resin coating layer had an approximately uniform thickness (with no convex portion). In sample A, the thickness of the resin coating layer was 10 µm at the circumferential center portion (circumferential angle: 70°) and 6 µm at the circumferential end. In sample B, the thickness of the resin coating layer was approximately uniform, which was 10 µm. The samples were cut at each circumferential angle in a radial center, and the thickness of the resin coating layer was measured by cross-sectional observation with use of an optical microscope.

Under conditions shown in Table 2, sample A and sample B were subjected to a seizure test. As a counter shaft, S55C was used. While the counter shaft was rotated at 2000 rpm, a load was increased at 1 MPa/10 min, and a maximum load at which no seizure occurs was determined as a non-seizure surface pressure. As a lubrication oil, VG22 at 100° C. was supplied at 200 cc/min. As shown in Table 1, as a result of the test, in sample B in which the resin coating layer had the approximately uniform thickness, the non-seizure surface pressure was 5 MPa, and in sample A in which the resin coating layer had the convex portion at the circumferential center portion, the non-seizure surface pressure was 6 MPa. The results showed that the resin coating layer having the convex portion at the circumferential center portion had higher seizure resistance.

TABLE 1

| Sample | Presence of convex portion | Non-seizure surface pressure (MPa) |
|---|---|---|
| A | Present | 6 |
| B | None (uniform) | 5 |

TABLE 2

| | |
|---|---|
| Tester | TW tester |
| Bearing size | φ 80 mm, width 10 mm, thickness 1.5 mm |
| Rotational speed | 2000 rpm |
| Load/Step | 1 MPa/10 min |
| Lubrication oil | VG22, 100° C., 200 cc/min |

Next, in order to examine an influence, on the seizure resistance, of a position at which the thickness of the resin coating layer of the half thrust bearing was maximum (hereinafter referred to as convex portion position), samples 1 to 7 were produced. Samples 1 to 7 had the same shape as sample A, and were produced by using the same material and manufacturing method as sample A. In Samples 1 to 7, however, only the convex portion position was varied in a circumferential angle of 70° to 110°. The samples were subjected to a seizure test under the above conditions. Table 3 shows the results of the seizure test. The samples in which the convex portion position was located at a circumferential angle of 75° to 105° had a non-seizure surface pressure of 7 MPa, but the samples in which the convex portion position was located at a circumferential angle of 70° and 110° had a non-seizure surface pressure of 6 MPa. This is presumably because the convex portion located at a circumferential angle of 75° to 105° facilitated formation of an oil film and improved the non-seizure surface pressure.

TABLE 3

| Sample | Circumferential angle (°) of convex portion position | Non-seizure surface pressure (MPa) |
|---|---|---|
| 1 | 90 | 7 |
| 2 | 80 | 7 |
| 3 | 100 | 7 |
| 4 | 75 | 7 |
| 5 | 105 | 7 |
| 6 | 70 | 6 |

TABLE 3-continued

| Sample | Circumferential angle (°) of convex portion position | Non-seizure surface pressure (MPa) |
|---|---|---|
| 7 | 110 | 6 |

Next, while the convex portion position was fixed at 90°, the thickness distribution of the resin coating layer at the circumferential angle was varied. The distribution was defined by the following equation (1):

$$t(\theta)/t_{max} \times 100 = A \times \exp[-\{(\theta-B)/C\}^2] + D \quad (1).$$

In the equation (1), $t(\theta)$ represents a thickness of the resin coating layer at a circumferential angle $\theta$, and $t_{max}$ represents a thickness of the resin coating layer at the convex portion position, which was 10 μm. B represents a circumferential angle at the convex portion position, which was 90°. At the convex portion position $\theta=B$, $t(\theta)=t_{max}$, and thus $A+D=100$, and when D is determined, A is also determined.

Then, values of C and D were varied and an influence of the variation in the values on the seizure resistance was examined. Table 4 shows the varied values of C and D and the non-seizure surface pressure.

TABLE 4

| Sample | Circumferential angle (°) of convex portion position | C | D | Non-seizure surface pressure (MPa) |
|---|---|---|---|---|
| 11 | 90 | 13.4 | 93.5 | 8 |
| 12 | 90 | 12.5 | 31.9 | 8 |
| 13 | 90 | 97.4 | 92.9 | 8 |
| 14 | 90 | 96.2 | 33.7 | 8 |
| 15 | 90 | 8.8 | 33.2 | 7 |
| 16 | 90 | 104.6 | 92.3 | 7 |
| 17 | 90 | 12.8 | 95.9 | 7 |
| 18 | 90 | 95.6 | 27.8 | 7 |

The results in Table 4 shows that samples 11 to 14 had a higher non-seizure surface pressure than samples 15 to 18. Thus, it was found that the samples in which the parameters C and D of the equation (1) satisfied $10 \leq C \leq 100$ and $30 \leq D \leq 95$ had higher seizure resistance.

Next, the parameters C and D were further varied in this range, and a relationship at that time was examined between a circumferential angle of a maximum inclination position and the seizure resistance. Table 5 shows the results of the examination.

TABLE 5

| Sample | Circumferential angle (°) of convex portion position | C | D | Circumferential angle (°) of maximum inclination position | Difference (°) between maximum inclination position and convex portion position | Non-seizure surface pressure (MPa) |
|---|---|---|---|---|---|---|
| 21 | 90 | 94.6 | 90.3 | 23.1 | 66.9 | 8 |
| 22 | 90 | 90.8 | 89.6 | 25.8 | 64.2 | 10 |
| 23 | 90 | 81.7 | 92.9 | 32.2 | 57.8 | 11 |
| 24 | 90 | 45.0 | 32.2 | 58.2 | 31.8 | 11 |
| 25 | 90 | 30.4 | 56.7 | 68.5 | 21.5 | 11 |
| 26 | 90 | 23.5 | 47.8 | 73.4 | 16.6 | 10 |
| 27 | 90 | 18.2 | 65.4 | 77.1 | 12.9 | 8 |

The results in Table 5 shows that samples 22 to 26 had a higher non-seizure surface pressure than samples 21 and 27 and sample 23 to 25 had a particularly high non-seizure surface pressure. Thus, it was found that among the samples in which the parameters C and D of the equation (1) satisfied 10≤C≤100 and 30≤D≤95, the samples in which the maximum inclination position was located at a position apart from the convex portion position by a circumferential angle of 15° to 65° had higher seizure resistance, and the samples in which the maximum inclination position was located at a position apart from the convex portion position by a circumferential angle of 20° to 60° had even higher seizure resistance.

Next, a relationship at the maximum inclination position was examined between a value of an inclination (maximum inclination) of a tangent line to a curve A×exp $[-\{(\theta-B)/C\}^2]+D$ (i.e., $t(\theta)/t_{max}\times 100$) expressed by the equation (1) and the seizure resistance. Table 6 shows the results of the examination.

TABLE 6

| Sample | Circumferential angle (°) of convex portion position | C | D | Circumferential angle (°) of maximum inclination position | Maximum inclination | Non-seizure surface pressure (MPa) |
| --- | --- | --- | --- | --- | --- | --- |
| 31 | 90 | 76.5 | 91.7 | 35.9 | 0.09 | 11 |
| 32 | 90 | 80.5 | 89.9 | 33.1 | 0.11 | 13 |
| 33 | 90 | 82.9 | 84.8 | 31.4 | 0.16 | 14 |
| 34 | 90 | 43.7 | 84.4 | 59.1 | 0.31 | 14 |
| 35 | 90 | 55.9 | 66.2 | 50.5 | 0.52 | 14 |
| 36 | 90 | 65.8 | 49.6 | 43.5 | 0.66 | 14 |
| 37 | 90 | 33.5 | 65.9 | 66.3 | 0.87 | 14 |
| 38 | 90 | 61.0 | 32.3 | 46.9 | 0.95 | 13 |
| 39 | 90 | 32.2 | 55.0 | 67.2 | 1.20 | 13 |
| 40 | 90 | 86.0 | 86.7 | 29.2 | 0.13 | 12 |
| 41 | 90 | 25.9 | 66.5 | 71.7 | 1.11 | 12 |
| 42 | 90 | 42.9 | 36.5 | 59.7 | 1.27 | 11 |

The results in Table 6 shows that samples 32 to 39 had a higher non-seizure surface pressure than samples 31 and 42, and samples 33 to 37 had a particularly high non-seizure surface pressure. Thus, it was found that the samples having a maximum inclination value of 0.10 to 1.20 had higher seizure resistance, and the samples having a maximum inclination value of 0.15 to 0.90 had even higher seizure resistance.

Furthermore, in order to examine an influence of the thickness of the resin coating layer on the seizure resistance, samples 43 to 47 were produced. In samples 43 to 47, a convex portion was provided at a circumferential angle of 90°, 10≤C≤100 and 30≤D≤95 were satisfied. Furthermore, in samples 43 to 47, the maximum inclination position was located at a position apart from the convex portion position by a circumferential angle of 20° to 60°, and the maximum inclination value was adjusted to 0.15 to 0.90. In samples 43 to 47, the thickness of the resin coating layer was varied as shown in Table 7. That is, the thickness of the resin coating layer at the convex portion position was varied from 2 to 30 μm, and the minimum thickness of the resin coating layer was varied from 1 to 28 μm. However, as a result, as shown in Table 7, all the samples had a non-seizure surface pressure of 14 MPa, and thus the non-seizure surface pressure was the same regardless of the thickness of the resin coating layer. Therefore, it was found that by setting the above requirements, excellent seizure resistance can be obtained regardless of the absolute thickness of the resin coating layer.

TABLE 7

| Sample | Circumferential angle (°) of convex portion position | C | D | Circumferential angle (°) of maximum inclination position | Maximum inclination | Thickness (μm) of resin coating layer at convex portion position | Minimum thickness (μm) of resin coating layer | Non-seizure surface pressure (MPa) |
| --- | --- | --- | --- | --- | --- | --- | --- | --- |
| 43 | 90 | 59.7 | 42.8 | 47.8 | 0.82 | 2 | 1 | 14 |
| 44 | 90 | 48.7 | 76.5 | 55.6 | 0.41 | 5 | 4 | 14 |
| 45 | 90 | 55.3 | 45.7 | 50.9 | 0.84 | 20 | 10 | 14 |

TABLE 7-continued

| Sample | Circumferential angle (°) of convex portion position | C | D | Circumferential angle (°) of maximum inclination position | Maximum inclination | Thickness (μm) of resin coating layer at convex portion position | Minimum thickness (μm) of resin coating layer | Non-seizure surface pressure (MPa) |
|---|---|---|---|---|---|---|---|---|
| 46 | 90 | 37.2 | 91.9 | 63.7 | 0.19 | 30 | 28 | 14 |
| 47 | 90 | 67.2 | 31.7 | 42.5 | 0.87 | 30 | 13 | 14 |

REFERENCE SIGNS LIST

1: Bearing device
11: Journal part
12: Thrust collar surface
2: Cylinder block
3: Bearing cap
4: Bearing housing
5: Bearing hole (holding hole)
6: Seat
7: Half bearing
8: Half thrust bearing
81: Sliding surface
81a: Oil groove
82: Upper surface of substrate
83: Circumferential end faces
84: Reference surface
84a: Back surface
85: Circumferential center
86: Circumferential center portion
87: Thrust relief
88: Resin coating layer
89: Substrate
f: Axial force
SD: Sliding direction

The invention claimed is:

1. A half thrust bearing having a semi-annular shape, the half thrust bearing having a sliding surface for receiving an axial force and a back surface opposite to the sliding surface, the half thrust bearing comprising:
   a substrate; and
   a resin coating layer coated on the substrate, a surface of the resin coating layer being the sliding surface, the resin coating layer having a thickness,
   wherein the thickness of the resin coating layer is maximum only at a single center portion in a circumferential direction of the half thrust bearing and is reduced toward circumferential ends of the half thrust bearing, and the thickness of the resin coating layer at the circumferential ends is smaller than the maximum thickness of the resin coating layer.

2. The half thrust bearing according to claim 1, wherein the center portion is located at a circumferential angle of 75° to 105°.

3. The half thrust bearing according to claim 1, wherein when the half thrust bearing is viewed along a circumferential direction of the half thrust bearing, the sliding surface of the half thrust bearing has a convex contour protruding at the center portion.

4. The half thrust bearing according to claim 3, wherein the contour of the sliding surface is curved.

5. The half thrust bearing according to claim 3, wherein the contour of the sliding surface is made of straight lines.

6. The half thrust bearing according to claim 1, wherein the thickness of the resin coating layer depends on a circumferential angle and is defined by the following equation:

$$t(\theta)/t_{max} \times 100 = A \times \exp\left[-\{(\theta-B)/C\}^2\right] + D \qquad (1),$$

where $t(\theta)$ represents a value of the thickness of the resin coating layer at a circumferential angle $\theta$; $t_{max}$ represents a maximum value of the thickness of the resin coating layer; B represents a value of a circumferential angle) (°) allowing the thickness of the resin coating layer to be maximum; and A, C, and D are constants satisfying $10 \leq C \leq 100$, $30 \leq D \leq 95$, and $A=100-D$.

7. The half thrust bearing according to claim 6, wherein an inclination of a tangent line to a curve of the thickness of the resin coating layer at the circumferential angle defined by the equation (1) is maximum at a position apart from a B position by 15° to 65°.

8. The half thrust bearing according to claim 7, wherein the inclination of the tangent line to the curve is maximum at a position apart from the B position by 20° to 60°.

9. The half thrust bearing according to claim 6, wherein a maximum inclination of a tangent line to a curve of $t(\theta)/t_{max}-100$ at the circumferential angle defined by the equation (1) is 0.10 to 1.20.

10. The half thrust bearing according to claim 9, wherein the maximum inclination of the tangent line is 0.15 to 0.90.

11. A thrust bearing comprising a first half thrust bearing and a second half thrust bearing, wherein at least one of the first half thrust bearing and the second half thrust bearing is the half thrust bearing according to claim 1.

12. The half thrust bearing according to claim 1 for receiving an axial force of a crankshaft of an internal combustion engine.

13. A bearing device comprising the half thrust bearing according to claim 1.

14. An internal combustion engine comprising the bearing device according to claim 13.

15. A half thrust bearing having a semi-annular shape, the half thrust bearing having a sliding surface for receiving an axial force and a back surface opposite to the sliding surface, the half thrust bearing comprising:
   a substrate; and
   a resin coating layer coated on the substrate, a surface of the resin coating layer being the sliding surface, the resin coating layer having a thickness,
   wherein a thickness of the resin coating layer is maximum at a center portion in a circumferential direction of the half thrust bearing, and is reduced toward circumferential ends of the half thrust bearing,
   wherein the thickness of the resin coating layer depends on a circumferential angle and is defined by the following equation:

$$t(\theta)/t_{max} \times 100 = A - \exp\left[-\{(\theta-B)/C\}^2\right] + D \qquad (1),$$

where $t(\theta)$ represents a value of the thickness of the resin coating layer at a circumferential angle $\theta$; $t_{max}$ represents a maximum value of the thickness of the resin coating layer; B represents a value of a circumferential angle allowing the thickness of the resin coating layer to be maximum; and A, C, and D are constants satisfying $10 \leq C \leq 100$, $30 \leq D \leq 95$, and $A=100-D$.

* * * * *

UNITED STATES PATENT AND TRADEMARK OFFICE
CERTIFICATE OF CORRECTION

| | |
|---|---|
| PATENT NO. | : 11,221,042 B2 |
| APPLICATION NO. | : 16/762633 |
| DATED | : January 11, 2022 |
| INVENTOR(S) | : Tetsuya Ogawa et al. |

It is certified that error appears in the above-identified patent and that said Letters Patent is hereby corrected as shown below:

In the Claims

Claim 9, Column 14, Line 34, replace "$t(\theta)/t \; max - 100$" with --$t(\theta)/t \; max \times 100$--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*